Nov. 6, 1951  R. H. SINGER  2,574,353
SCREW PROPELLED PLOW
Filed April 7, 1948  3 Sheets-Sheet 3
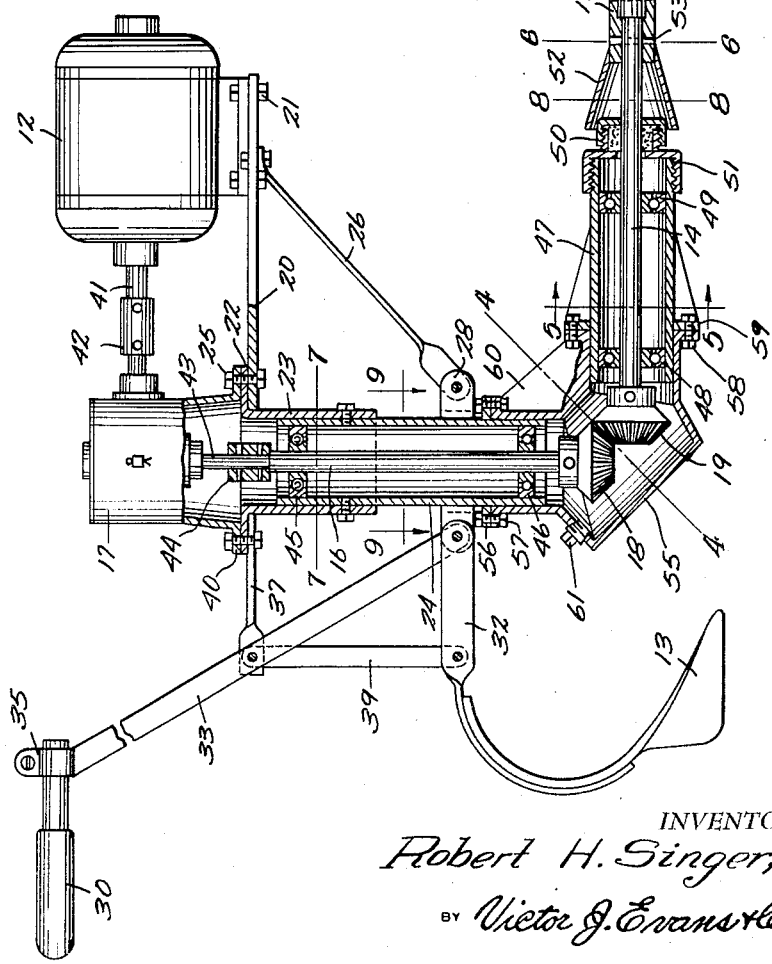
INVENTOR.
Robert H. Singer,
BY Victor J. Evans & Co.
ATTORNEYS Patented Nov. 6, 1951

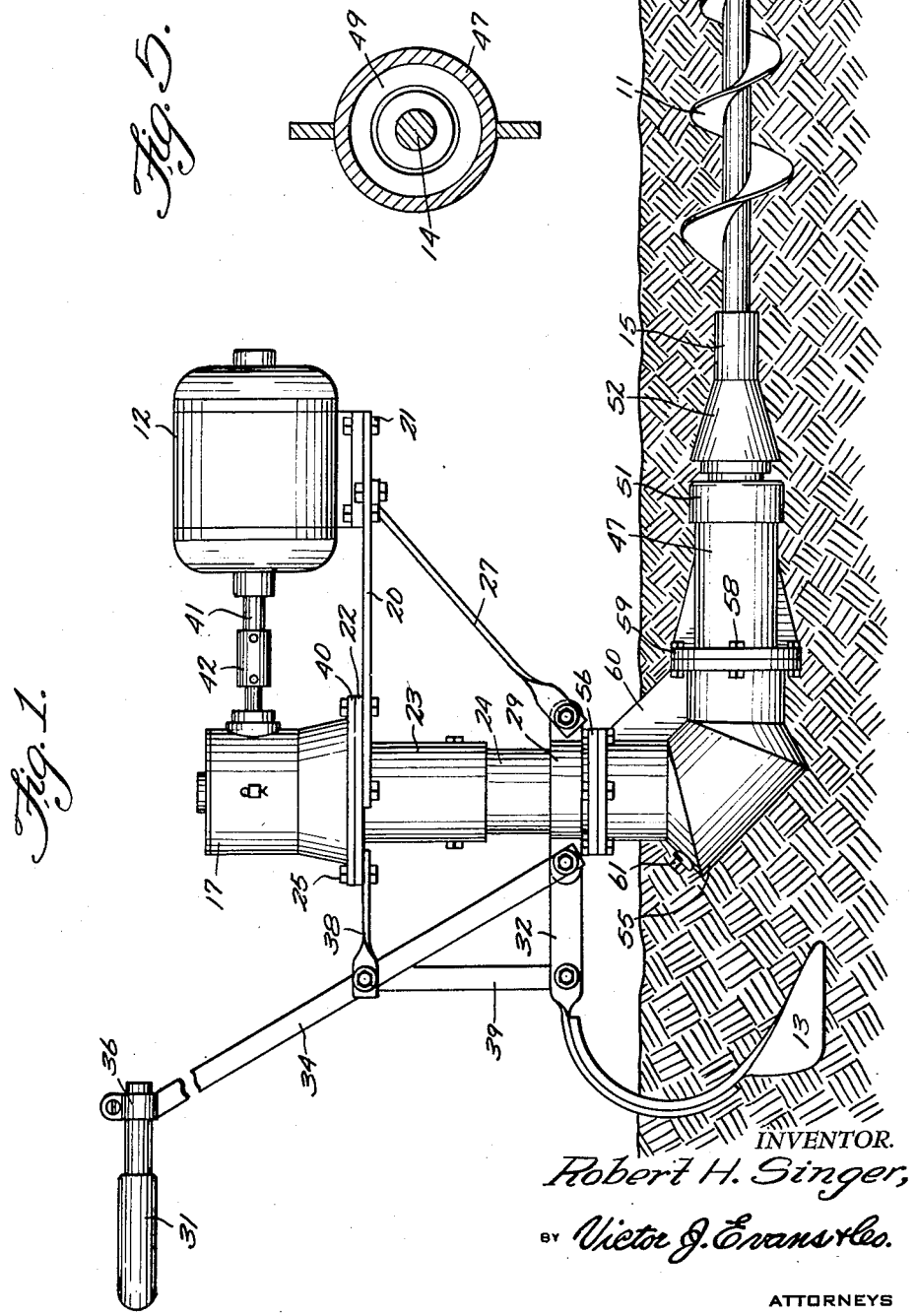

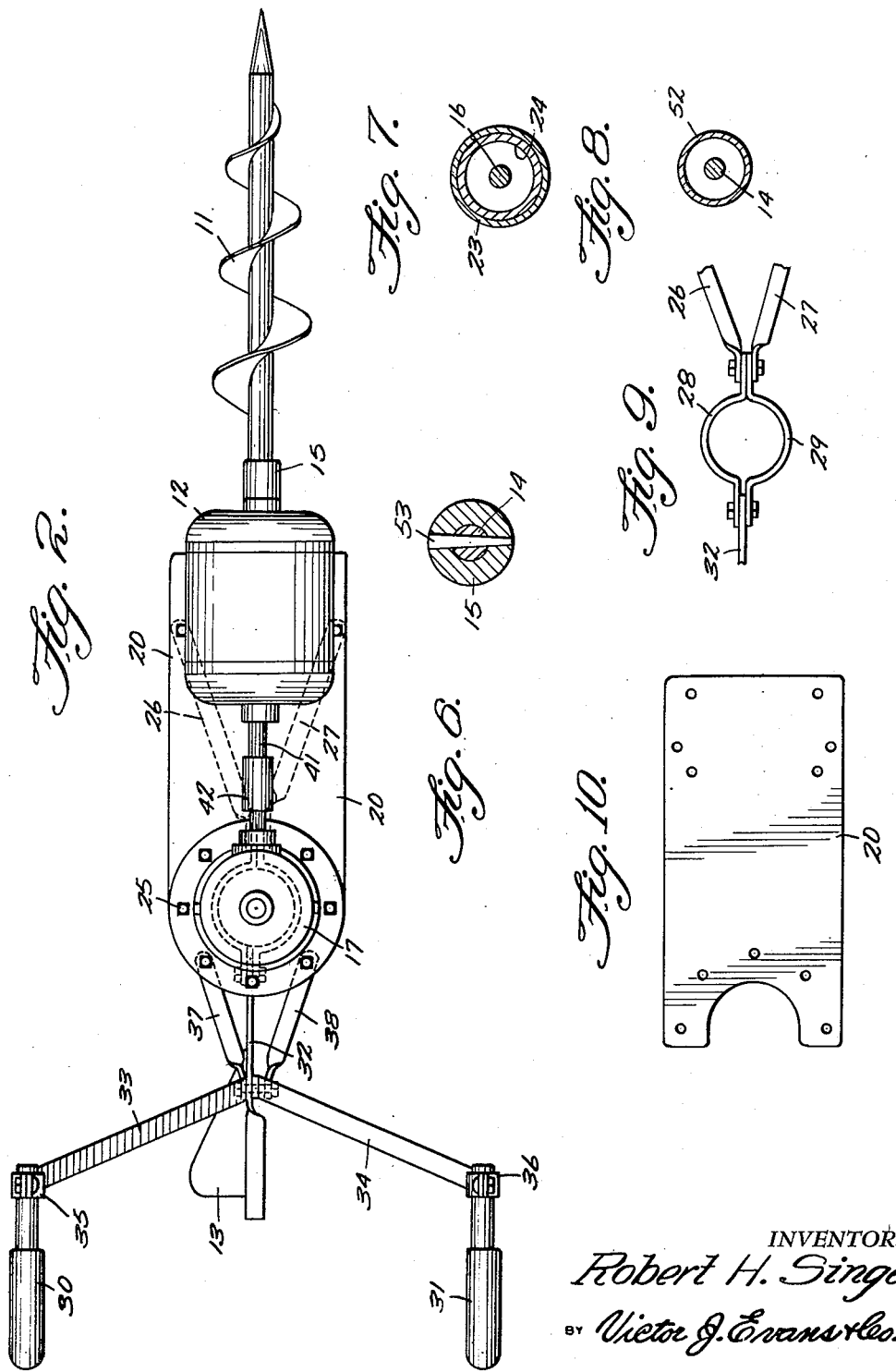

2,574,353

UNITED STATES PATENT OFFICE 2,574,353

SCREW PROPELLED PLOW

Robert H. Singer, Pittsburgh, Pa.

Application April 7, 1948, Serial No. 19,610

1 Claim. (Cl. 97—35)

This invention relates to farm implements of the motor driven type, and in particular a plow or cultivator having a horizontally disposed auger or screw positioned slightly below the surface of the soil with a motor for rotating the screw wherein the screw provides propelling means for the implement as it is rotated.

The purpose of this invention is to provide improved traction means for plows, harrows, and other farm implements wherein excessive weight is eliminated and the power required for actuating the implement is reduced to a minimum.

It requires considerable power to draw the average farm implement through the soil or over the ground and in order to obtain sufficient traction considerable weight is required and this takes power. Furtherfore when the propelling force is applied from a point a few feet above the ground additional power is required as the resultant force is in a line parallel to and slightly below the surface of the ground.

With this thought in mind this invention contemplates a farm implement wherein the propelling agent is positioned directly in the line of force wherein the weight, driving power, and associated instrumentalities are reduced to a minimum.

The object of this invention is, therefore, to provide power operating means for a propelling agent of farm implements wherein the power means may be positioned above the ground with the propelling agent below the surface of the ground.

Another object of the invention is to provide a screw propelled plow that may be actuated by two handles similar to the handles of a single or double shovel plow.

Another object of the invention is to provide a motor propelled plow in which the propelling means assists in breaking up the soil ahead of the plow.

A further object of the invention is to provide a screw propelled farm implement which is of a comparatively simple and economical construction.

With these and other objects and advantages in view the invention consists of the new and novel combination, construction, and arrangement of parts as hereinafter more fully described, set forth in the claim appended hereto, and disclosed in the accompanying drawings, forming part hereof, wherein:

Figure 1 is a view showing a side elevation of the plow with the screw and plow positioned in operative position in the ground.

Figure 2 is a plan view of the plow.

Figure 3 is a view similar to that shown in Figure 1 showing a vertical and longitudinal section through the transmission elements of the housing.

Figure 4 is a cross section through the gear housing taken on line 4—4 of Figure 3, with the gears omitted, showing the wedge-shaped fin for breaking the ground.

Figure 5 is a cross section through the lower part of the housing taken on line 5—5 of Figure 3.

Figure 6 is a cross section through the coupling member between the screw and shaft taken on line 6—6 of Figure 3.

Figure 7 is a cross section through the vertical part of the housing taken on line 7—7 of Figure 3.

Figure 8 is a cross section through the deflecting shield on the lower shaft being taken on line 8—8 of Figure 3.

Figure 9 is a detail taken on line 9—9 of Figure 3 showing the connection of the motor support braces to the vertical section of the housing.

Figure 10 is a plan view of the motor base with other parts omitted.

Referring now to the drawings wherein like reference characters denote corresponding parts the motor operated screw propelled plow of this invention includes a tapering screw 11, a motor 12, and a plow share 13, and the screw is connected to the forward end of a horizontal auger shaft 14 by a coupling 15 and the shaft 14 is rotated from the motor 12 through a vertical shaft 16 with a gear reduction 17 at the upper end and bevel gears 18 and 19 at the lower end.

The motor is mounted on a base plate 20 by bolts 21 and the plate 20 is secured to a flange 22 at the upper end of a vertically disposed tubular casing or sleeve 23 on the vertical section 24 of the transmission housing by bolts 25. The plate 20 is supported by braces 26 and 27 from the lower end of the section 24 by a clamp formed with straps 28 and 29, as shown in Figure 9. The plow share 13 and the handles 30 and 31 are also mounted on the vertical section 24 through the straps 28 and 29 with the plow held by a bar 32, and with the handles mounted on the upper ends of bars 33 and 34 by clamps 35 and 36. The bars 33 and 34 are held by braces 37 and 38 from the flange 22 with the bar 32 on which the plow is mounted held by a strut 39.

The gear reduction 17 is provided with a base flange 40 through which it is mounted on the flange 22 and the gear reduction is driven by the motor shaft 41 through a coupling 42. Extending downward from the gear reduction 17 is a stub shaft 43 which is connected to the shaft 16 by a coupling 44, and the shaft 16 is rotatably mounted in the section 24 by the bearings 45 and 46. The horizontal shaft 14 is rotatably mounted in the section 47 of the housing by bearings 48 and 49, and the forward end of the section 47 is provided with a packing gland 50 in a cap 51. The packing gland is protected from the soil by a conical shield 52 on the end of the coupling 15 that connects the shaft of the screw 11 to the forward end of the shaft 14 with tapered pins 53 and 54.

The sections 24 and 47 of the housing are connected by an angle section 55, the upper end of which is secured to an annular flange 56 on the section 24 by bolts 57, and the section 47 is secured to a flange on the opposite end by bolts 58 through an annular flange 59. The angle section 55 is provided with a wedge-shaped blade 60 that breaks the soil as the device is drawn ahead by the screw 11, and the opposite side of the section 55 is provided with a plug 61 through which grease may be supplied to the gears and bearings.

The motor may be provided with electric current from any suitable source, or a gasoline engine, or motor of any other type may be used.

With the parts arranged in this manner the motor may be started and with the point of the screw tilted into the ground the screw will draw itself into the position shown in Figure 1 and as it continues to rotate it will draw the plow through the soil plowing the soil as shown. The plow share may be replaced by a harrow, cultivator, or other implement as may be desired, and the size of the screw may be changed accordingly. Should the load exceed the power of the screw or should the screw engage rocks, roots, and the like one of the pins 53 or 54 will shear providing safety means to prevent breaking the parts.

It will be understood that other modifications may be made in the design or arrangement of the parts without departing from the spirit of the invention.

What is claimed is:

In a screw propelled plow, the combination which comprises a vertically disposed tubular casing, an upper gear housing on the upper end of the tubular casing, a lower gear housing on the lower end of the said tubular casing, a vertically disposed shaft journaled in the said tubular casing, a base plate carried by and extended from the upper end of the said vertically disposed tubular casing, a motor mounted on the said base plate, means driving the vertically disposed shaft from the motor through the said upper gear housing, a tubular housing section extended forwardly from the said lower gear housing, an auger shaft having a tapering screw thereon journaled in and extended from the said tubular housing section extended from the lower gear housing, gears in the lower gear housing for driving the auger shaft by the said vertically disposed shaft, a bar mounted on the lower end of the said vertically disposed tubular casing, a plow share carried by the said bar and positioned to follow the said tapering screw, a triangular shaped soil breaking blade positioned at the intersection of the lower gear housing and vertically disposed tubular casing and on the leading side of the said tubular casing whereby the soil is parted as the plow travels through the ground, and a handle extended upwardly from the said vertically disposed tubular casing.

ROBERT H. SINGER.

REFERENCES CITED

The following references are of record in the file of this patent:

UNITED STATES PATENTS

| Number | Name | Date |
|---|---|---|
| 1,303,399 | Ryan | May 13, 1919 |
| 2,135,973 | Garlinger | Nov. 8, 1938 |
| 2,317,567 | Vinsonhaler | Apr. 27, 1943 |

FOREIGN PATENTS

| Number | Country | Date |
|---|---|---|
| 445,369 | France | Aug. 31, 1912 |
| 154,437 | Great Britain | Dec. 2, 1920 |